(12) United States Patent
Gider et al.

(10) Patent No.: US 11,199,425 B2
(45) Date of Patent: Dec. 14, 2021

(54) DYNAMIC CURRENT CONTROL OF A TRANSMITTER FOR MAGNETIC PROXIMITY SENSING

(71) Applicant: Apple Inc., Cupertino, CA (US)

(72) Inventors: Savas Gider, San Jose, CA (US); Jian Guo, Milpitas, CA (US); John Greer Elias, Townsend, DE (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 16/584,840

(22) Filed: Sep. 26, 2019

(65) Prior Publication Data

US 2020/0103252 A1 Apr. 2, 2020

Related U.S. Application Data

(60) Provisional application No. 62/737,806, filed on Sep. 27, 2018.

(51) Int. Cl.
*G01D 5/20* (2006.01)
*G01V 3/10* (2006.01)

(52) U.S. Cl.
CPC ...................... *G01D 5/20* (2013.01)

(58) Field of Classification Search
CPC ......... G01R 33/0029; G01V 3/10; G01D 5/20
See application file for complete search history.

(56) References Cited

U.S. PATENT DOCUMENTS

| 5,729,129 | A | 3/1998 | Acker |
| 7,642,788 | B2 | 1/2010 | Gallavan |
| 8,664,942 | B2 | 3/2014 | May |
| 8,699,947 | B2 | 4/2014 | Nystrom et al. |
| 9,733,275 | B2 | 8/2017 | Deliwala et al. |
| 9,791,518 | B2 | 10/2017 | Aoki et al. |
| 10,551,451 | B2 | 2/2020 | Trakimas et al. |
| 2008/0129347 | A1* | 6/2008 | Williams ............... H03F 3/217 327/108 |
| 2020/0103473 | A1 | 4/2020 | Guo et al. |

FOREIGN PATENT DOCUMENTS

EP 2653846 4/2012

* cited by examiner

*Primary Examiner* — Minh Q Phan
(74) *Attorney, Agent, or Firm* — Fish & Richardson P.C.

(57) ABSTRACT

Magnetic sensing technology can be used to detect changes, or disturbances (e.g., changes in magnetic field strength), in magnetic fields and can be used to measure the precise location/positioning of an electronic device in proximity to a magnetic source. In order to avoid interference by earth's static magnetic field, a modulated magnetic field can be used for magnetic based proximity sensing. Received modulated magnetic field signals can be demodulated to determine a received magnetic field strength. A drive current of a magnetic transmitter coil can be varied to maintain the detected magnetic field strength at a target value or within a desirable range. The drive current can also be varied to remain below a burnout current level that can cause damage to the transmitter coil.

18 Claims, 6 Drawing Sheets

DYNAMIC CURRENT CONTROL OF A TRANSMITTER FOR MAGNETIC PROXIMITY SENSING

CROSS-REFERENCE TO RELATED APPLICATION

This application claims priority to U.S. Provisional Patent Application No. 62/737,806, filed Sep. 27, 2018, the entire contents of which are incorporated herein by reference.

FIELD OF THE DISCLOSURE

This relates generally to a method for magnetic sensor based proximity sensing and devices, systems, and methods based on magnetic sensor based proximity sensing. More particularly, this relates to dynamic current control of a transmitter used in a magnetic sensor based proximity sensing architecture.

BACKGROUND OF THE DISCLOSURE

Magnetic sensing technology can be used to detect changes, or disturbances (e.g., changes in magnetic field strength), in magnetic fields and can be used to measure the precise location/positioning of an electronic device in proximity to a magnetic source. In order to avoid interference by earth's static magnetic field, a modulated magnetic field can be used for magnetic based proximity sensing. Received modulated magnetic field signals can be demodulated to determine proximity of the sensor to the source of the modulated magnetic field.

SUMMARY OF THE DISCLOSURE

This disclosure relates to a magnetic sensor based proximity sensing architecture that enables precise location/positioning of electronic devices (e.g. smartphone, tablet, handset, wearable devices, or accessories) in proximity to a modulated magnetic source. More particularly, this relates to current control of a transmitter used in such a magnetic sensor based proximity sensing architecture.

More specifically, it relates to dynamic current control of a transmitter for a magnetic sensor based proximity sensing architecture. A differential voltage source pair modulated at a frequency can generate a corresponding modulation current. An electromagnetic coil (e.g., spiral, cylindrical, or circular) can get excited by the modulation current and generate a magnetic field B (T) that has the same modulation simulation. A magnetic sensor receives the modulated magnetic field and performs demodulation. The distance d between the magnetic sensor and the electromagnetic coil can be determined based on the amount of drive current for the electromagnetic coil necessary to produce a specified magnetic field strength at the sensor. Multiple magnetic sensors aligned to detect the magnetic field along different field direction axes can also be used to determine the three-dimensional position of the electronic device based on the magnetic field.

BRIEF DESCRIPTION OF THE DRAWINGS

For a better understanding of the various described examples, reference should be made to the Detailed Description below, in conjunction with the following drawings in which like reference numerals refer to corresponding parts throughout the figures.

DETAILED DESCRIPTION

Figure 1A:
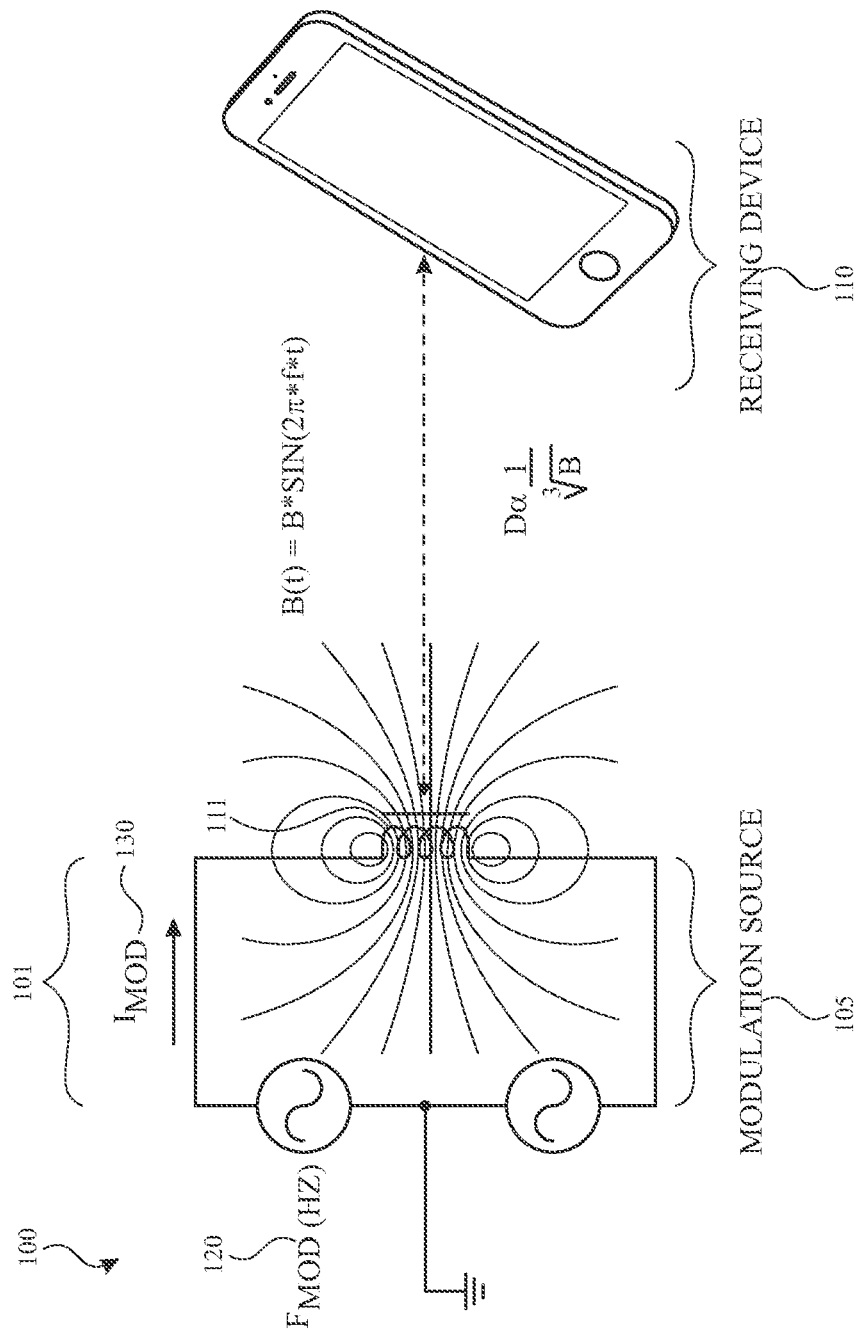
FIGS. 1A and 1B illustrate an exemplary architecture based on magnetic sensor based proximity sensing according to examples of the disclosure.

In the following description of examples, reference is made to the accompanying drawings which form a part hereof, and in which it is shown by way of illustration specific examples that can be optionally practiced. It is to be understood that other examples can be used and structural changes can be made without departing from the scope of the disclosed examples.

Various techniques and process flow steps will be described in detail with reference to examples as illustrated in the accompanying drawings. In the following description, numerous specific details are set forth in order to provide a thorough understanding of one or more aspects and/or features described or referenced herein. It will be apparent, however, to one skilled in the art, that one or more aspects and/or features described or referenced herein may be practiced without some or all of these specific details.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one-step is described after the other step). Moreover, the illustration of a process by its depiction in a drawing does not imply that the illustrated process is exclusive of other variations and modification thereto, does not imply that the illustrated process or any of its steps are necessary to one or more of the examples, and does not imply that the illustrated process is preferred.

Magnetic sensing technology can be used to detect changes, or disturbances (e.g., changes in magnetic field strength), in magnetic fields and can be used to measure the precise location/positioning of an electronic device in proximity to a magnetic source. In order to avoid interference by earth's static magnetic field, a modulated magnetic field can be used for magnetic based proximity sensing. Received modulated magnetic field signals can be demodulated to determine sensor proximity to the source of the modulated magnetic field. This disclosure relates to a magnetic sensor based proximity sensing architecture that enables precise location/positioning of electronic devices (e.g. smartphone, tablet, handset or wearable devices) in proximity to a modulated magnetic source. In particularly, this disclosure relates to dynamic current control of a transmitter for the magnetic sensor based proximity sensing architecture of the disclosure.

Representative applications of methods and apparatus according to the present disclosure are described in this section. These examples are being provided solely to add context and aid in the understanding of the described examples. It will thus be apparent to one skilled in the art that the described examples may be practiced without some or all of the specific details. In other instances, well-known process steps have been described in detail in order to avoid unnecessarily obscuring the described examples. Other applications are possible, such that the following examples should not be taken as limiting.

FIG. 1A illustrates an exemplary architecture of magnetic sensor based proximity sensing according to examples of the disclosure. The magnetic sensor based proximity sensing architecture 100 can include a modulation source 105 and a receiving device 110. In some examples, a differential modulation voltage source pair (120A, 120B) can be modulated at a single tone frequency ($f_{mod}$) can generate a corresponding modulation current $I_{mod}$ 130. In some examples, an electromagnetic transmitter coil 111 (e.g., spiral, cylindrical, or circular) excited by the modulation current can generate a modulated magnetic field B(t). In some examples, a receiving device 110 can receive the modulated magnetic field at a receiver (e.g., at a corresponding receiving coil, magnetoresistive sensor, or the like) and perform demodulation on the current induced in the receiver by the magnetic field. In some examples, the drive current for the electromagnetic transmitter coil 111 can be held constant, and the distance d between electronic device and transmitter coil can be determined based on the magnetic field amplitude after demodulation, where the distance is proportional to the inverse of the cube root of magnetic field strength. In some examples, the drive current of the electromagnetic transmitter coil 111 can be adjusted to produce a desired magnetic field strength in the receiver (e.g., a receiving coil or magnetoresistive sensor). In such an example, the distance d between the electronic device and the receiver can be determined based on the drive current of the electromagnetic transmitter coil 111. In some examples, a magnetic sensor arrangement that is capable of detecting both distance and direction can be utilized to obtain additional information about the positioning of an electronic device or accessory. For example, a magnetic sensor arrangement can be configured to detect magnetic field components for multiple directions (e.g., x, y, and z components), and the multiple field components can be used to determine a three-dimensional position of the electronic device or accessory. In some examples, the multiple components can be obtained by including multiple magnetic sensors oriented to be sensitive to magnetic field variation in orthogonal directions. In some examples, a three-axis sensor can be used to determine the direction of the magnetic field as well as the distance.

It should also be understood that by using a modulated magnetic field from the modulation source 105, a magnetic sensing configuration that rejects the effects of magnetic interferences such permanent magnets, Earth's magnetic field, and DC power sources, etc. can be realized. In some examples, the use of a modulated magnetic field may also offer improved stability against environmental interferences as the magnetic field measurement can be locked at a specific operation frequency which provides the opportunity to filter unwanted AC interferences from other frequency bands. In some examples, the use of a modulated magnetic field may also offer improved stability over long term drift, e.g., magnetic sensor offset drift and coil magnetic field drift due to thermal heating. For example, to the extent that the effects of magnetic sensor direct and coil magnetic drift manifest as a DC offset at the output of a magnetic sensor, the DC offset component can be filtered out after demodulation.

As briefly described above, in some examples the transmitter 101 and receiving device 110 can work in conjunction to control a transmitted signal strength. For example, when the receiving device 110 approaches close proximity to the transmitter 101, a sensor within the receiving device 110 can become saturated (e.g., as described for an exemplary magnetoresistive sensor in FIG. 2 below) due to the large signal strength resulting from the close proximity of the transmitter 101 and the receiving device 110. In some examples, by reducing the transmitted signal strength as the receiving device 110 approaches closer to the transmitter 101, the saturation of the sensor circuitry in the receiving device 110 can be avoided. In addition, for small distances between the transmitter 101 and the receiving device 110, maintaining a high current for driving the transmitter can consume unnecessary power, where a lower current for the transmitter could still provide sufficient signal strength for determining the distance between the transmitter and receiver. On the other hand, as the receiving device 110 moves away from the transmitter 101, the magnetic field strength can fall of quickly, as magnetic field strength falls off with the cube of distance. In some examples, the transmit power of the transmitter 101 can be increased to increase sensing range of the magnetic sensor. In some examples, driving additional current through the transmitter coil 111 can cause the transmitter coil to heat up. In some examples, the current through transmitter coil 111 can be limited such that it remains below a burnout current ($I_{MAX}$) that can cause physical damage to the transmitter coil. Thus, a control scheme for the drive current of the transmitter coil 111 in a magnetic transmitter 101 can be used to reduce current when a receiving device 110 is nearby and to increase current up to an upper limit current (e.g., $I_{MAX}$) when the receiving device is far away and/or out of sensing range. In some examples, controlling the current to achieve the above objectives can be achieved by adjusting the transmitter coil 111 current to maintain a constant magnetic field strength at the receiving device 110. In such examples, the distance between the transmitter 101 and the receiving device 110 can be calculated based on the transmitter coil 111 current used to achieve the desired field strength in the receiving device. In some examples, rather than attempting to maintain the magnetic field strength at the receiving device 110 at a constant value, the magnetic field strength at the receiving device can be maintained within a magnetic field strength range. In such examples, both the transmitter coil 111 current and the measured magnetic field strength value at the receiving device can be used to determine the distance between the transmitter coil and the receiving device.

Figure 1B:
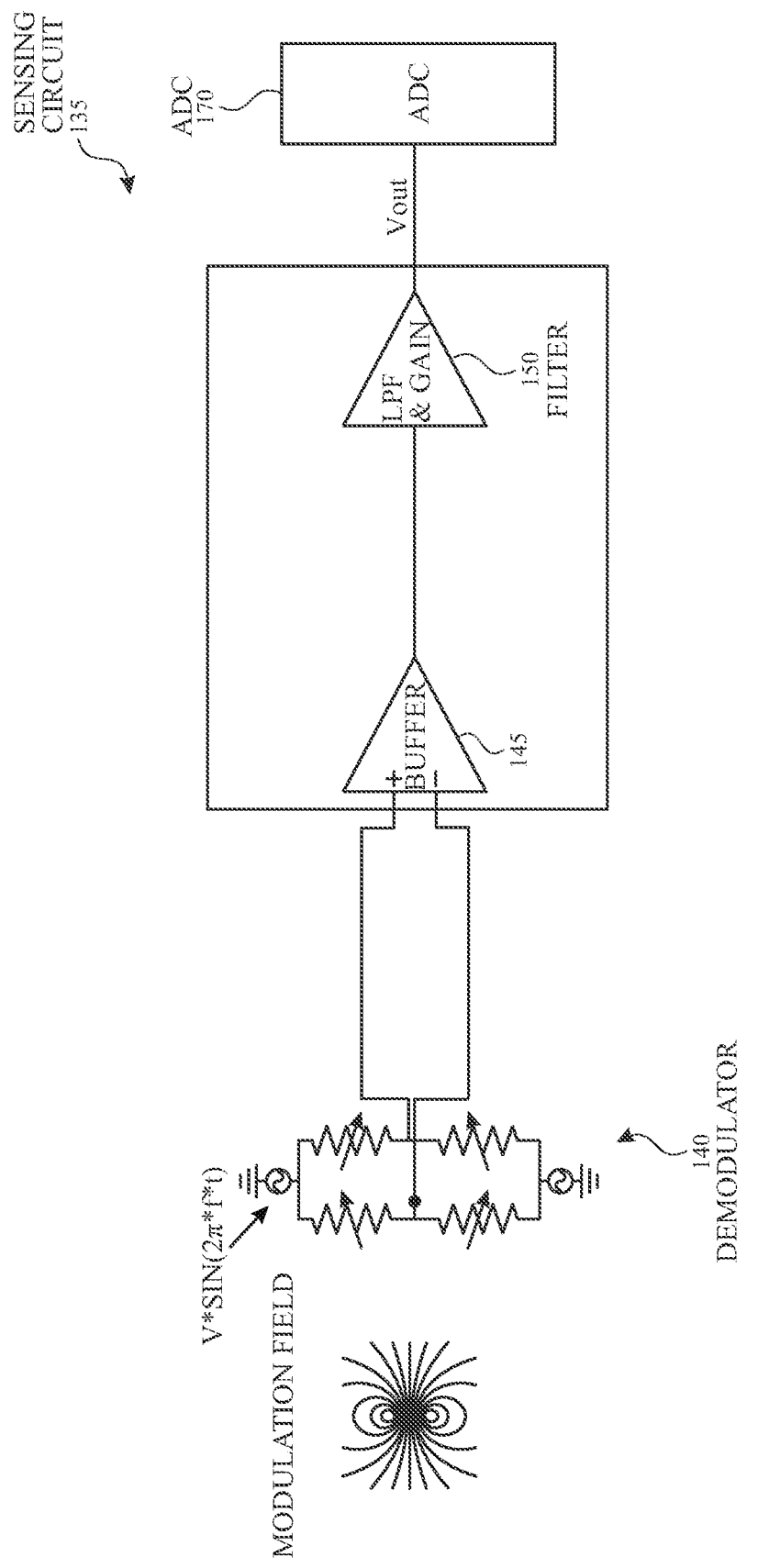
Figure 3:
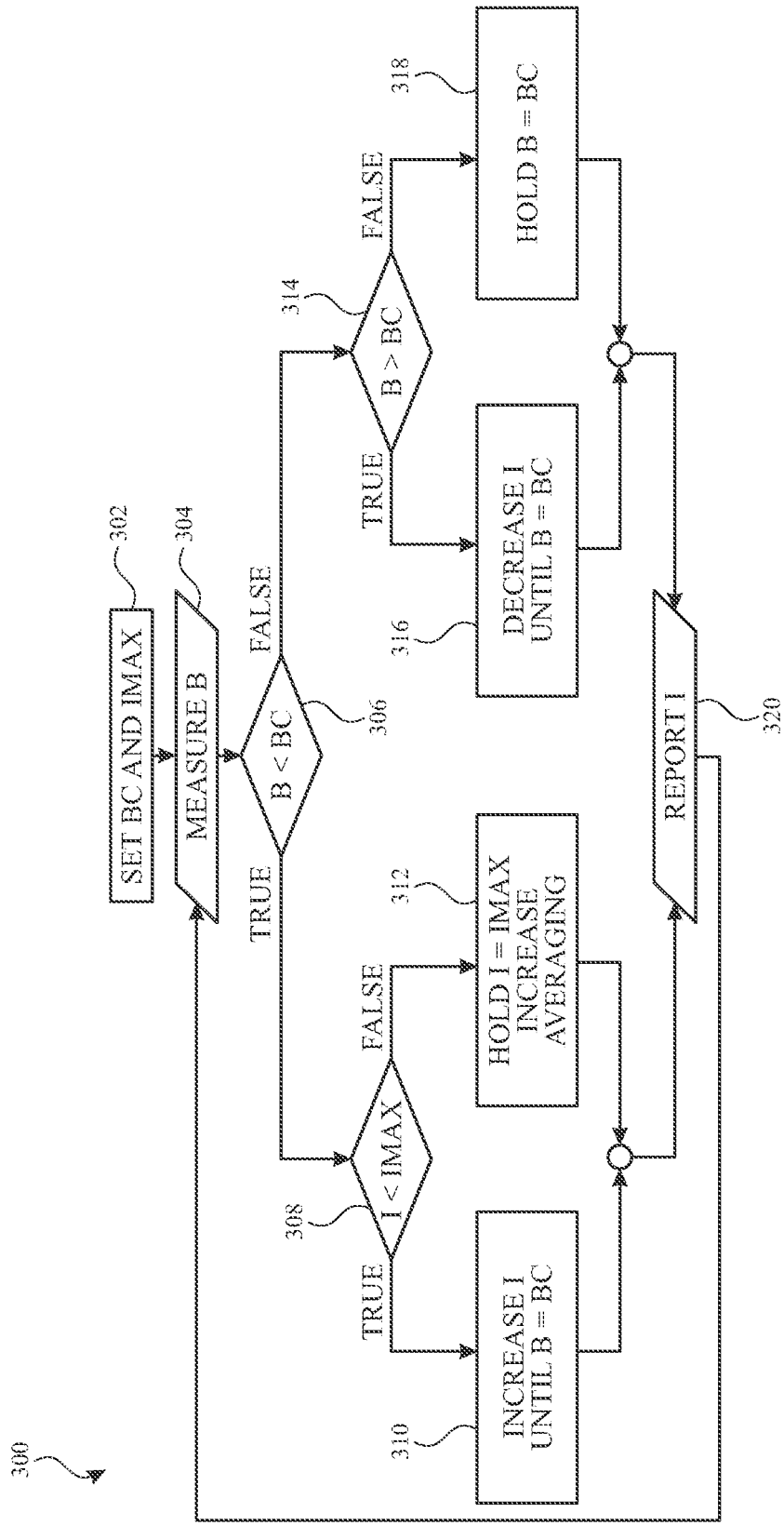
FIG. 3 illustrates an exemplary process for dynamic control of transmitter power in a magnetic sensor architecture according to examples of the disclosure.

FIG. 1B illustrates a partial electrical diagram of an exemplary magnetic sensing circuit 135 according to examples of the disclosure. The magnetic sensing circuit 135 can receive a modulated magnetic field and perform demodulation at demodulator 140. In some examples, the demodulator 140 can be a Wheatstone bridge modulated at the same frequency (f) as the incoming magnetic field and can convert the magnetic field into voltage output. Accordingly, because the demodulation occurs before digitization, the example of FIG. 1B can be considered an analog demodulation scheme. It should be understood by those of ordinary skill in the art that other circuit architectures for performing analog domain modulation can be used without departing from the scope of the present disclosure. After demodulation, the differential output of the Wheatstone bridge can be buffered at buffer 145 and the buffered signal can be passed through a low-pass filter 150 to remove high frequency components (e.g., at frequency 2*f). This filtering can eliminate any low frequency magnetic interferences ($B_0$) that the magnetic sensor can see from the environment which can manifest as high frequency components after demodulation at the demodulator 140. In some examples, an ADC 170 can convert the filtered signal Vout into digital outputs for post-processing. In some examples, the digital outputs can report a magnetic field strength received at the receiving device 110 (e.g., via a communications link) to control circuitry for the transmitter (e.g., 105 in FIG. 1A). Exemplary applications of modulated magnetic field based proximity sensing will be discussed in more detail in connection with the figures below. FIG. 3 below illustrates an exemplary process for performing a current control scheme according to examples of the disclosure.

Figure 2:
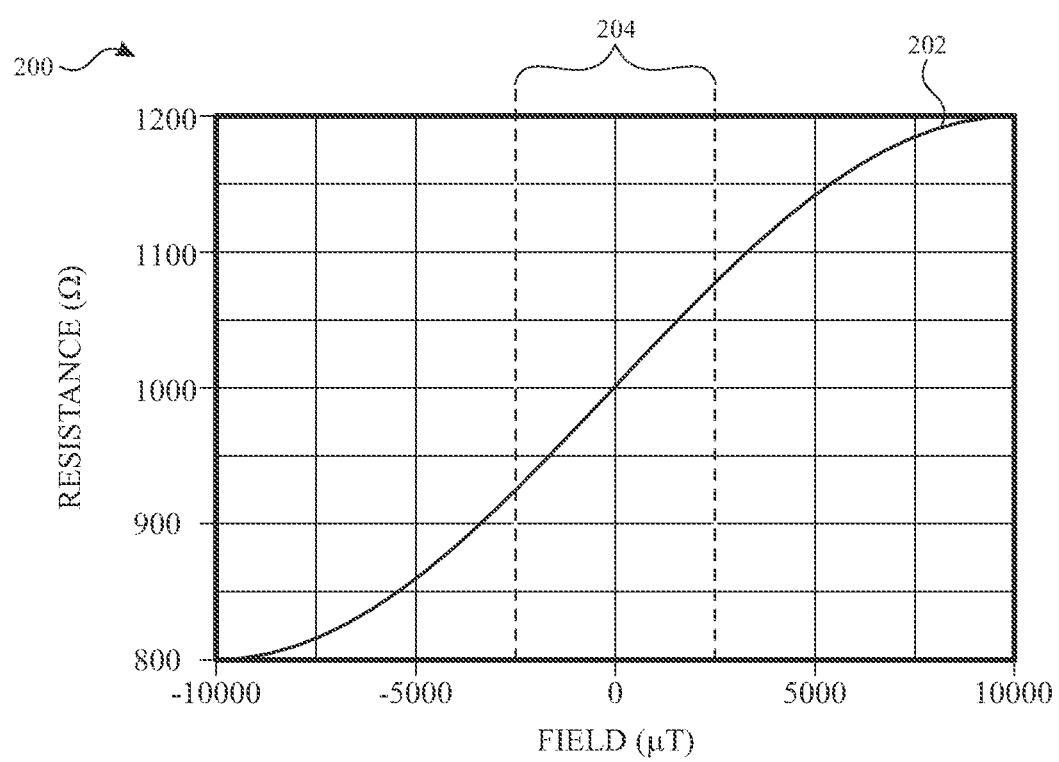
FIG. 2 illustrates an exemplary response curve of a magneto-resistive sensor according to examples of the disclosure.

FIG. 2 illustrates an exemplary response curve of a magnetoresistive sensor according to examples of the disclosure. In FIG. 2, the curve 202 can represent a response of a magnetoresistive sensor that has a resistance that varies according to a magnetic field strength applied to the magnetoresistive sensor element. The horizontal axis of the plot in FIG. 2 can represent a magnetic field strength (B) acting upon the magnetoresistive sensor element, including positive and negative values based on the orientation of the magnetoresistive element relative to the magnetic field. The vertical axis of the plot in FIG. 2 can represent a resistance value of the magnetoresistive element, which depends on the magnetic field strength (B) acting upon the magnetoresistive sensor element. In the example of FIG. 2, the shape of the curve 202 can be understood as having a variation according to sin ($\alpha$). In an anisotropic magneresistance (AMR) sensor, $\alpha$ can represent an angle between the magnetization of the magnetoresistive material due to the incident magnetic field and the direction of current traveling through the magnetoresistor. In giant magnetoresistance (GMR) or tunnel magnetoristance (TMR) sensors, $\alpha$ can represent an angle between the magnetization of a free layer and the magnetization of pinned layers. Although the overall shape of the curve 202 may vary according non-linearly according to the function sin ($\alpha$), there can be a region 204 where the shape of curve 202 can be approximately linear for small magnetic fields. As also shown in the shape of curve 202, as the magnetic fields get large, the change in resistance of the magnetoresistor begins to flatten such that a magnetoresistive sensor having the characteristic curve 202 may be unable to distinguish field strength above a certain maximum limit. This flattening of the curve 202 can be problematic for situations where the receiving device (e.g., 110 above) is close to the transmitter (e.g., 105 above) where field strength can become large and vary significantly for small changes of distance due to the cubic relationship between distance and field strength. Although while particular resistance values are shown in the vertical axis in FIG. 2, it should be understood that the exact values of resistance illustrated in the curve 202 are merely provided for the purposes of example, and magnetoresistive sensors with different resistance values and response to external magnetic fields can be used without departing from the scope of the present disclosure. In such examples, a system for dynamic control of transmitter power can be used to adjust the transmitted field strength within a linear region 204 of the sensor. It should be understood that in some examples, magnetic sensors such as a hall sensor may not exhibit a similar non-linear characteristic to the exemplary magnetoresistance sensor. In some examples, the current dynamic control of transmitter power according to examples of the disclosure can still be used to limit power consumption for a transmitter for nearby objects and to maintain a transmitter current below a burnout current level for distant objects.

FIG. 3 illustrates an exemplary process 300 for dynamic control of transmitter power in magnetic sensor based proximity sensing architecture (e.g., 100 above) according to examples of the disclosure. At step 302, the process 300 can set a target magnetic field strength $B_C$ and a maximum transmitter coil current $I_{MAX}$. As explained above, the maximum transmitter coil (e.g., transmitter coil 111 above) current $I_{MAX}$ can be set below a burnout current of the transmitter coil. In some examples, the target magnetic field strength $B_C$ can be set to fall within a linear range of the magnetic sensor in a receiving device (e.g., 110 above). In some examples, the target magnetic field strength $B_C$ can be a single constant value. In some examples, the target magnetic field strength can comprise a range of field strength values. In the described steps below, comparisons between the measured field strength B and target magnetic field strength $B_C$ are described. In some examples, when the target magnetic field strength $B_C$ is a range, a value of magnetic field strength B is less than $B_C$ when B is lower than the lowest value of the range for $B_C$. Similarly, that magnetic field strength B can be equal to a range for $B_C$ when B falls anywhere within the range for $B_C$. In some examples, the magnetic field strength $B_C$ can be set to provide a sufficient signal-to-noise ratio (SNR) for receiver sense circuitry in the receiving device. At step 304, the process 300 can measure the magnetic field strength B at the receiving device (e.g., 110 above). In some examples, at step 306, the process 300 can compare the measured magnetic field strength B and the target magnetic field strength $B_C$ that was set at step 302 of process 300. In some examples, if it is determined at step 306 that the measured magnetic field strength B is less than the target magnetic field strength $B_C$, process 300 can proceed to step 308. At step 308, the transmitter coil current I can be compared to the transmitter coil max current $I_{MAX}$ that was set at step 302 of process 300. In some examples, if the comparison at step 308 determines that the transmitter coil current I is less than $I_{MAX}$, the process 300 can proceed to step 310. At step 310, the process 300 can increase the transmitter coil current I to bring the measured magnetic field strength B up to the constant value of $B_C$ or within the range of $B_C$. Although step 310 is described as bringing the measured field strength B up to the value of $B_C$ in a single step, it should be understood that the changes in transmitter coil current I and corresponding changes in measured field strength B can be achieved incrementally over multiple steps occurring in rapid succession. As a result, the increase of the transmitter coil current I at step 310 can be an incremental increase that causes a corresponding incremental increase in B, rather than performing an increase to the exact value of I that is expected to make B equal to the target magnetic field strength $B_C$. However in some other examples, step 310 can attempt to adjust the transmitter coil current I to make B equal to $B_C$ in a single step without departing from the scope of the present disclosure. In some examples, if the comparison at step 308 determines that the transmitter coil current I is not less than $I_{MAX}$, the process 300 can proceed to step 312. At step 312, the transmitter coil current I can be held at the $I_{MAX}$ value and prevented from a further increase to prevent damage to the transmitter coil. In addition, in some examples, since power cannot be further increase, other measures can be taken to increase SNR and potentially detect distant objects. Accordingly, in some examples, at step 312 instead of increasing transmitter coil current I, and increase number of measurements can be performed and averaged.

In some examples, if it is determined at step 306 that the measured magnetic field strength B is not less than the $B_C$, process 300 can proceed to step 314. In some examples, step 314 can determine whether the magnetic field strength is greater than the target magnetic field strength $B_C$. If it is determined at step 314 that the magnetic field strength B is greater than target magnetic field strength $B_C$, the process 300 can proceed to step 316. At step 316, the process 300 can decrease the transmitter coil current I until the magnetic field strength B is equal to the target magnetic field strength $B_C$. Although step 316 is described as bringing the measured field strength B down to the value of $B_C$ in a single step, it should be understood that the changes in transmitter coil current I and corresponding changes in measured field strength B can be achieved incrementally over multiple steps occurring in rapid succession. As a result, the decrease of the transmitter coil current I at step 316 can be an incremental decrease that causes a corresponding incremental decrease in B, rather than performing a decrease to the exact value of I that is expected to make B equal to the target magnetic field strength $B_C$. However in some other examples, step 316 can attempt to adjust the transmitter coil current I to make B equal to $B_C$ in a single step without departing from the scope of the present disclosure. In some examples, if it is determined at step 314 that the magnetic field strength B is not greater than the target magnetic field strength $B_C$, process 300 can proceed to step 318. In some examples, at step 318 the process 300 can maintain the transmitter coil current I at a constant value, thus maintaining the magnetic field strength B at a value equal to the target magnetic field strength $B_C$. After each of the steps 310, 312, 316 and 318 completes, the process 300 can proceed to step 320. At step 320, the process 300 can report the transmitter coil current I either after adjustment (e.g., at step 310 or 316) or without adjustment (e.g., at step 312 or 318). After the transmitter coil current I is reported at step 320 of process 300, the process can return to step 304. In some examples, the reported transmitted coil current I value from step 320 can be used in the subsequent iteration of the process 300 (e.g., if the process 300 reaches step 308), as well as being used to determine the distance between the transmitter (e.g., 101 above) receiving device (e.g., 110 above).

Figure 4:
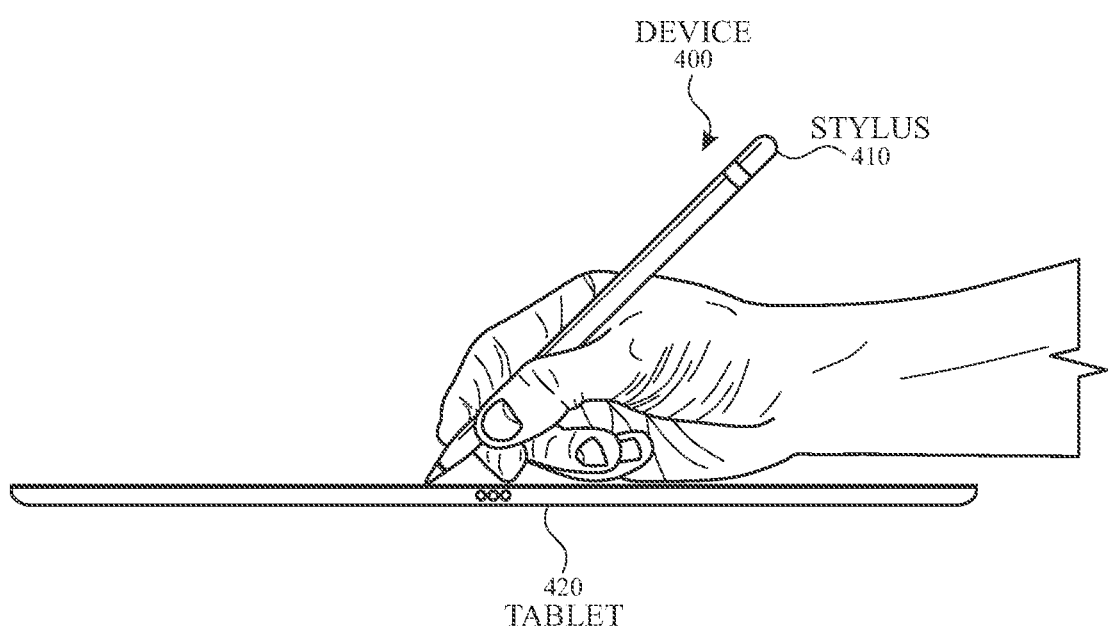
FIG. 4 illustrates an exemplary architecture based on magnetic sensor based proximity sensing in a stylus-tablet system according to examples of the disclosure.

FIG. 4 illustrates an exemplary architecture based on magnetic sensor based proximity sensing in a stylus-tablet system according to examples of the disclosure. In some examples, the magnetic field generator can be located in the tablet 420 and a magnetic sensor can be located in the stylus 410. In some examples, a magnetic field generator can be provided in each corner of the tablet 420, and distances from each of the four corners can be used to determine the position of the stylus 410 relative to the tablet. In some examples, the stylus 410 can include a magnetic sensor based proximity sensor on each end of the stylus, allowing both distance and orientation of the stylus to be detected. In some examples, magnetic sensor based proximity sensing can be used to perform gesture recognition between the tablet and the stylus without requiring the stylus to contact the sensing surface. In some examples, the magnetic sensor located in the transmitter included in the tablet 520 can utilize dynamic transmitter current control in conjunction with the magnetic sensor or sensors located in the stylus 410 according to examples of the disclosure.

Figure 5:
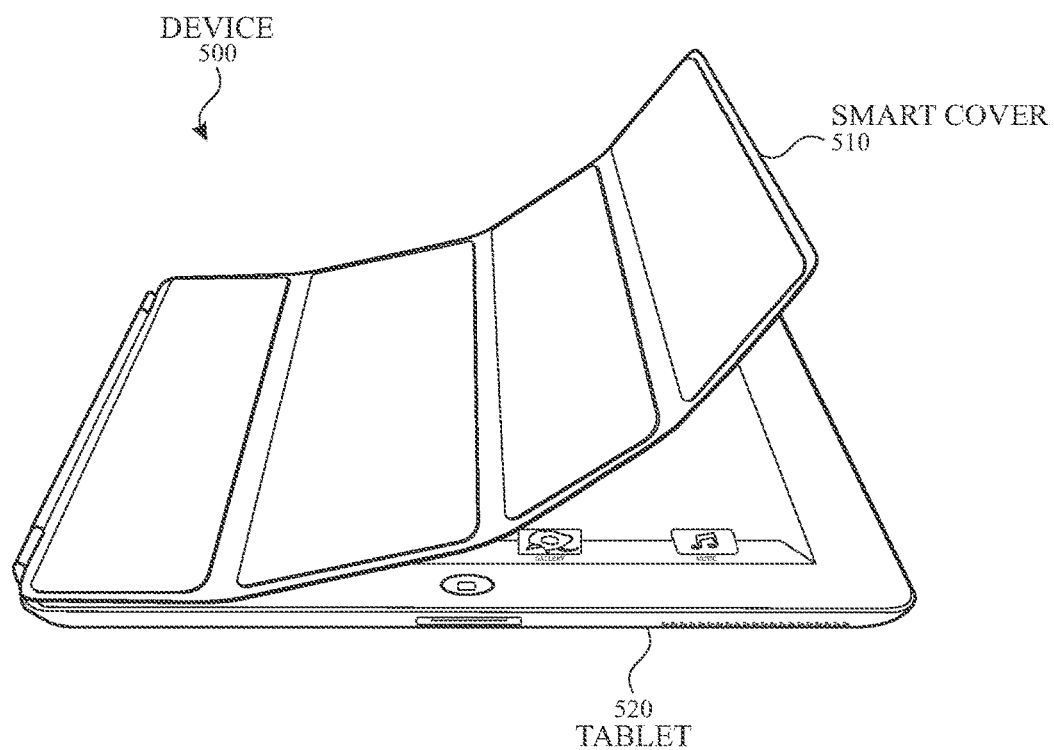
FIG. 5 illustrates an exemplary architecture based on magnetic sensor based proximity sensing in a smart tablet cover system according to examples of the disclosure.

FIG. 5 illustrates an exemplary architecture based on magnetic sensor based proximity sensing in a smart tablet cover system according to examples of the disclosure. In some examples, a magnetic field generator can be located in the tablet 520 and a magnetic sensor can be located in the smart cover 510. In some examples, magnetic sensor based proximity sensing according to examples of the disclosure can be used to determine whether the cover is open, as well as how far the cover is open. Compared to cover based on static magnetic fields for determining whether the cover is open, a system based on magnetic sensor based proximity sensing using modulated magnetic sensor can have improved immunity to the effects of interfering magnetic fields. For example, a smart cover incorporating a modulated magnetic field sensor may not falsely cause a device to turn on or off in the presence of a static magnetic field from a source other than the tablet 520. In some examples, the magnetic sensor located in the transmitter included in the tablet 520 can utilize dynamic transmitter current control in conjunction with the magnetic sensor located in the smart cover 510 according to examples of the disclosure.

Figure 6:
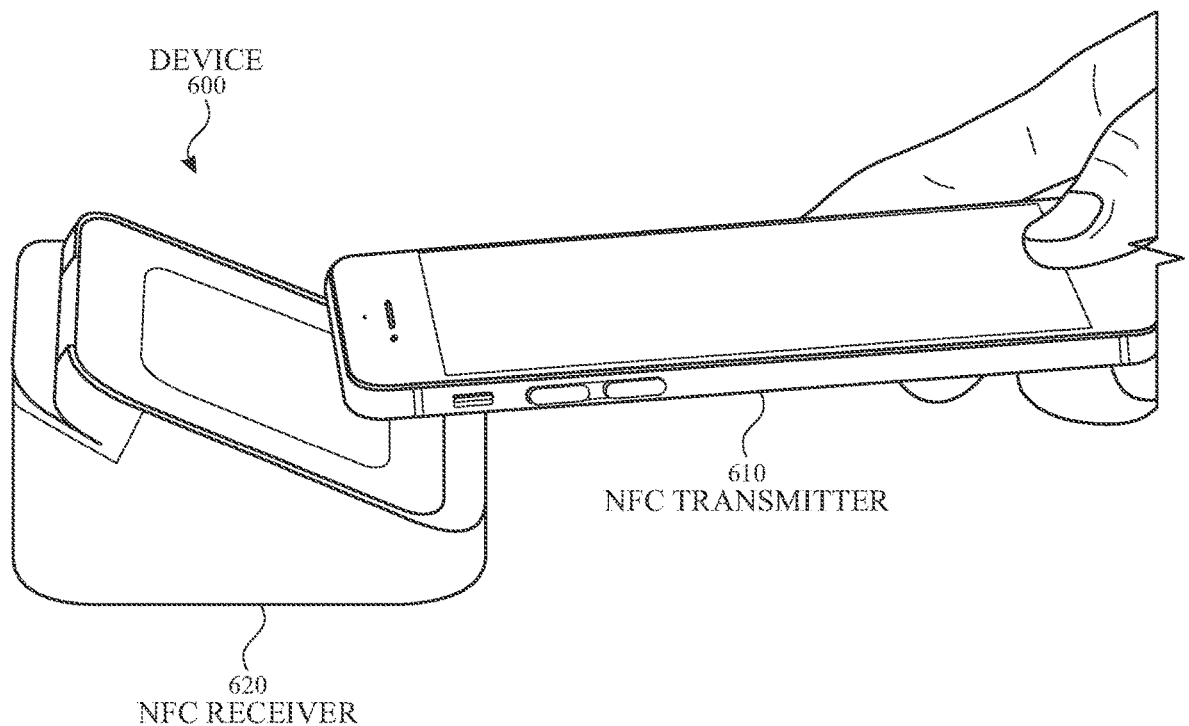
FIG. 6 illustrates an exemplary architecture based on magnetic sensor based proximity sensing in a Near Field Communication system according to examples of the disclosure.

FIG. 6 illustrates an exemplary architecture based on magnetic sensor sensing of a modulated magnetic field in a Near Field Communication system according to examples of the disclosure. Magnetic sensor based communication sensing can be used to enhance the performance of a Near Field Communication system. Near Field Communication system generally needs precise alignment between the transmitter and the receiver but with the magnetic sensor based sensing, a greater amount of misalignment can be tolerated. In some examples, a modulated magnetic field based NFC transmitter 610 can be included in an electronic device. In some examples, an NFC receiver 620 can include a magnetic sensor according to examples of the disclosure. In some examples, the NFC transmitter 610 can utilize dynamic transmitter current control in conjunction with the NFC receiver 620 according to examples of the disclosure above.

Therefore, according to the above, some examples of the present disclosure are directed to a method comprising transmitting a modulated magnetic field using a transmitting coil having a first drive current receiving, from a receiving device, a magnetic field strength received at the receiving device based on the transmitted modulated magnetic field comparing the received magnetic field strength with a target magnetic strength value, determining whether the received magnetic field strength is less than the target magnetic strength value, in accordance with a determination that the received magnetic field strength is less than the target magnetic strength value, determining whether the first drive current is less than a maximum drive current value, in accordance with a determination that the first drive current is less than the maximum drive current value, supplying the transmitting coil with a second drive current, greater than the first drive current, and in accordance with a determination that the first drive current is equal to the maximum drive current value, continuing supplying the transmitting coil with the first drive current, determining whether the received magnetic field strength is greater than the target magnetic strength value, in accordance with a determination that the received magnetic field strength is greater than the target magnetic strength value, supplying the transmitting coil with a third drive current, less than the first drive current, and in accordance with a determination that the received magnetic field strength is equal to the target magnetic strength value, supplying the transmitting coil with the first drive current.

Additionally or in the alternative, in some examples, the method further comprises determining a distance between the transmitting coil and the receiving device based on an amount of current driven through the transmitting coil. Additionally or in the alternative, in some examples, the target magnetic strength value is a magnetic field strength value that falls within a linear operation region of a magnetic sensor included in the receiving device. Additionally or in the alternative, in some examples, the target magnetic strength value is a single constant value. Additionally or in the alternative, in some examples, the target magnetic strength value comprises a range, wherein a determination that the received magnetic field strength is less than the target magnetic strength value comprises determining that the received magnetic field strength is less than a lowest value in the range, and determining that the magnetic field strength is greater than the target magnetic strength value comprises determine that the received magnetic field strength is more than a largest value in the range. Additionally or in the alternative, in some examples, the method further comprises determining a distance between the transmitting coil and the receiving device based on an amount of current driven through the transmitting coil and a value of the received magnetic field strength within the range.

Some examples of the disclosure are directed to a non-transitory computer-readable storage medium storing one or more programs, the one or more programs comprising instructions, which when executed by one or more processors of an electronic device, cause the device to perform a method comprising: transmitting a modulated magnetic field using a transmitting coil having a first drive current receiving, from a receiving device, a magnetic field strength received at the receiving device based on the transmitted modulated magnetic field comparing the received magnetic field strength with a target magnetic strength value, determining whether the received magnetic field strength is less than the target magnetic strength value, in accordance with a determination that the received magnetic field strength is less than the target magnetic strength value, determining whether the first drive current is less than a maximum drive current value, in accordance with a determination that the first drive current is less than the maximum drive current value, supplying the transmitting coil with a second drive current, greater than the first drive current, and in accordance with a determination that the first drive current is equal to the maximum drive current value, continuing supplying the transmitting coil with the first drive current, determining whether the received magnetic field strength is greater than the target magnetic strength value, in accordance with a determination that the received magnetic field strength is greater than the target magnetic strength value, supplying the transmitting coil with a third drive current, less than the first drive current, and in accordance with a determination that the received magnetic field strength is equal to the target magnetic strength value, supplying the transmitting coil with the first drive current. Additionally or in the alternative, in some examples, the method further comprises determining a distance between the transmitting coil and the receiving device based on an amount of current driven through the transmitting coil. Additionally or in the alternative, in some examples, the target magnetic strength value is a magnetic field strength value that falls within a linear operation region of a magnetic sensor included in the receiving device. Additionally or in the alternative, in some examples, the target magnetic strength value is a single constant value. Additionally or in the alternative, in some examples, the target magnetic strength value comprises a range, wherein a determination that the received magnetic field strength is less than the target magnetic strength value comprises determining that the received magnetic field strength is less than a lowest value in the range, and determining that the magnetic field strength is greater than the target magnetic strength value comprises determine that the received magnetic field strength is more than a largest value in the range. Additionally or in the alternative, in some examples, the method further comprises determining a distance between the transmitting coil and the receiving device based on an amount of current driven through the transmitting coil and a value of the received magnetic field strength within the range.

Some examples of the disclosure are related to an electronic device comprising: a magnetic field transmitting coil, and one or more programs, wherein the one or more programs are stored in the memory and configured to be executed by the one or more processors, which when executed by the one or more processors, cause the electronic device to perform a method comprising: transmitting a modulated magnetic field using a transmitting coil having a first drive current receiving, from a receiving device, a magnetic field strength received at the receiving device based on the transmitted modulated magnetic field comparing the received magnetic field strength with a target magnetic strength value, determining whether the received magnetic field strength is less than the target magnetic strength value, in accordance with a determination that the received magnetic field strength is less than the target magnetic strength value, determining whether the first drive current is less than a maximum drive current value, in accordance with a determination that the first drive current is less than the maximum drive current value, supplying the transmitting coil with a second drive current, greater than the first drive current, and in accordance with a determination that the first drive current is equal to the maximum drive current value, continuing supplying the transmitting coil with the first drive current, determining whether the received magnetic field strength is greater than the target magnetic strength value, in accordance with a determination that the received magnetic field strength is greater than the target magnetic strength value, supplying the transmitting coil with a third drive current, less than the first drive current, and in accordance with a determination that the received magnetic field strength is equal to the target magnetic strength value, supplying the transmitting coil with the first drive current. Additionally or in the alternative, in some examples, the method further comprises determining a distance between the transmitting coil and the receiving device based on an amount of current driven through the transmitting coil. Additionally or in the alternative, in some examples, the target magnetic strength value is a magnetic field strength value that falls within a linear operation region of a magnetic sensor included in the receiving device. Additionally or in the alternative, in some examples, the target magnetic strength value is a single constant value. Additionally or in the alternative, in some examples, the target magnetic strength value comprises a range, wherein a determination that the received magnetic field strength is less than the target magnetic strength value comprises determining that the received magnetic field strength is less than a lowest value in the range, and determining that the magnetic field strength is greater than the target magnetic strength value comprises determine that the received magnetic field strength is more than a largest value in the range. Additionally or in the alternative, in some examples, the method further comprises determining a distance between the transmitting coil and the receiving device based on an amount of current driven through the transmitting coil and a value of the received magnetic field strength within the range.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:

1. A method comprising:
    transmitting a modulated magnetic field using a transmitting coil having a first drive current;
    receiving, from a receiving device, a magnetic field strength received at the receiving device based on the transmitted modulated magnetic field;
    comparing the received magnetic field strength with a target magnetic strength value;
    determining whether the received magnetic field strength is less than the target magnetic strength value;
    in accordance with a determination that the received magnetic field strength is less than the target magnetic strength value:
        determining whether the first drive current is less than a maximum drive current value;
        in accordance with a determination that the first drive current is less than the maximum drive current value, supplying the transmitting coil with a second drive current, greater than the first drive current; and
        in accordance with a determination that the first drive current is equal to the maximum drive current value, continuing supplying the transmitting coil with the first drive current;
    determining whether the received magnetic field strength is greater than the target magnetic strength value;
    in accordance with a determination that the received magnetic field strength is greater than the target magnetic strength value, supplying the transmitting coil with a third drive current, less than the first drive current; and
    in accordance with a determination that the received magnetic field strength is equal to the target magnetic strength value, supplying the transmitting coil with the first drive current.

2. The method of claim 1, further comprising determining a distance between the transmitting coil and the receiving device based on an amount of current driven through the transmitting coil.

3. The method of claim 1, wherein the target magnetic strength value is a magnetic field strength value that falls within a linear operation region of a magnetic sensor included in the receiving device.

4. The method of claim 1, wherein the target magnetic strength value is a single constant value.

5. The method of claim 1, wherein the target magnetic strength value comprises a range, wherein a determination that the received magnetic field strength is less than the target magnetic strength value comprises determining that the received magnetic field strength is less than a lowest value in the range, and determining that the magnetic field strength is greater than the target magnetic strength value comprises determine that the received magnetic field strength is more than a largest value in the range.

6. The method of claim 5, further comprising determining a distance between the transmitting coil and the receiving device based on an amount of current driven through the transmitting coil and a value of the received magnetic field strength within the range.

7. A non-transitory computer-readable storage medium storing one or more programs, the one or more programs comprising instructions, which when executed by one or more processors of an electronic device, cause the device to perform a method comprising:
    transmitting a modulated magnetic field using a transmitting coil having a first drive current;
    receiving, from a receiving device, a magnetic field strength received at the receiving device based on the transmitted modulated magnetic field;
    comparing the received magnetic field strength with a target magnetic strength value;
    determining whether the received magnetic field strength is less than the target magnetic strength value;
    in accordance with a determination that the received magnetic field strength is less than the target magnetic strength value:
        determining whether the first drive current is less than a maximum drive current value;
        in accordance with a determination that the first drive current is less than the maximum drive current value, supplying the transmitting coil with a second drive current, greater than the first drive current; and
        in accordance with a determination that the first drive current is equal to the maximum drive current value, continuing supplying the transmitting coil with the first drive current;
    determining whether the received magnetic field strength is greater than the target magnetic strength value;
    in accordance with a determination that the received magnetic field strength is greater than the target magnetic strength value, supplying the transmitting coil with a third drive current, less than the first drive current; and
    in accordance with a determination that the received magnetic field strength is equal to the target magnetic strength value, supplying the transmitting coil with the first drive current.

8. The non-transitory computer-readable storage medium of claim 7, the method further comprising determining a distance between the transmitting coil and the receiving device based on an amount of current driven through the transmitting coil.

9. The non-transitory computer-readable storage medium of claim 7, wherein the target magnetic strength value is a magnetic field strength value that falls within a linear operation region of a magnetic sensor included in the receiving device.

10. The non-transitory computer-readable storage medium of claim 7, wherein the target magnetic strength value is a single constant value.

11. The non-transitory computer-readable storage medium of claim 7, wherein the target magnetic strength value comprises a range, wherein a determination that the received magnetic field strength is less than the target magnetic strength value comprises determining that the received magnetic field strength is less than a lowest value in the range, and determining that the magnetic field strength is greater than the target magnetic strength value comprises determine that the received magnetic field strength is more than a largest value in the range.

12. The non-transitory computer-readable storage medium of claim 11, the method further comprising determining a distance between the transmitting coil and the receiving device based on an amount of current driven through the transmitting coil and a value of the received magnetic field strength within the range.

13. An electronic device comprising:
a magnetic field transmitting coil; and
one or more programs, wherein the one or more programs are stored in memory and configured to be executed by one or more processors, which when executed by the one or more processors, cause the electronic device to perform a method comprising:
transmitting a modulated magnetic field using the magnetic field transmitting coil having a first drive current;
receiving, from a receiving device, a magnetic field strength received at the receiving device based on the transmitted modulated magnetic field;
comparing the received magnetic field strength with a target magnetic strength value;
determining whether the received magnetic field strength is less than the target magnetic strength value;
in accordance with a determination that the received magnetic field strength is less than the target magnetic strength value:
determining whether the first drive current is less than a maximum drive current value;
in accordance with a determination that the first drive current is less than the maximum drive current value, supplying the transmitting coil with a second drive current, greater than the first drive current; and
in accordance with a determination that the first drive current is equal to the maximum drive current value, continuing supplying the transmitting coil with the first drive current;
determining whether the received magnetic field strength is greater than the target magnetic strength value;
in accordance with a determination that the received magnetic field strength is greater than the target magnetic strength value, supplying the transmitting coil with a third drive current, less than the first drive current; and
in accordance with a determination that the received magnetic field strength is equal to the target magnetic strength value, supplying the transmitting coil with the first drive current.

14. The electronic device of claim 13, the method further comprising determining a distance between the transmitting coil and the receiving device based on an amount of current driven through the transmitting coil.

15. The electronic device of claim 13, wherein the target magnetic strength value is a magnetic field strength value that falls within a linear operation region of a magnetic sensor included in the receiving device.

16. The electronic device of claim 13, wherein the target magnetic strength value is a single constant value.

17. The electronic device of claim 13, wherein the target magnetic strength value comprises a range, wherein a determination that the received magnetic field strength is less than the target magnetic strength value comprises determining that the received magnetic field strength is less than a lowest value in the range, and determining that the magnetic field strength is greater than the target magnetic strength value comprises determine that the received magnetic field strength is more than a largest value in the range.

18. The electronic device of claim 17, the method further comprising determining a distance between the transmitting coil and the receiving device based on an amount of current driven through the transmitting coil and a value of the received magnetic field strength within the range.

* * * * *